United States Patent

Takaya et al.

[11] Patent Number: 5,909,074
[45] Date of Patent: Jun. 1, 1999

[54] VIBRATION MOTOR FOR OBTAINING A STARTING TORQUE WITH A SMALL CURRENT

[75] Inventors: Kei Takaya; Teruyuki Motohashi, both of Tokyo, Japan

[73] Assignee: NEC Corporation, Tokyo, Japan

[21] Appl. No.: 08/991,040

[22] Filed: Dec. 16, 1997

Related U.S. Application Data

[63] Continuation of application No. 08/384,854, Feb. 7, 1995, abandoned.

[30] Foreign Application Priority Data

Feb. 9, 1994 [JP] Japan .................................... 7-036437

[51] Int. Cl.$^6$ .............................. H02K 7/06; F16H 33/10
[52] U.S. Cl. ................................................... 310/81; 74/87
[58] Field of Search ................................ 310/81, 80, 82, 310/75 A; 74/87, 61

[56] References Cited

U.S. PATENT DOCUMENTS 3,911,416  10/1975  Feder ................................. 340/825.46

FOREIGN PATENT DOCUMENTS

| 1 804 955 | 5/1969 | Germany . |
| 63-262069 | 10/1988 | Japan . |
| 2-111269 | 4/1990 | Japan . |
| 4-124862 | 11/1992 | Japan . |
| 862 591 | 3/1961 | United Kingdom . |

Primary Examiner—Nestor Ramirez
Assistant Examiner—Dang Dinh Le
Attorney, Agent, or Firm—Scully, Scott, Murphy & Presser

[57] ABSTRACT

The present invention is provided with a motor having a rotary shaft. A weight is fixed to a motor through guide pins formed to the rotary shaft. Each of springs has one end connected to the rotary shaft and the other end connected to the weight. The guide pins guide the vertical movement of the weight with respect to the rotary shaft. Holes are formed in the weight and the guide pins are pierced therethrough. A hook is formed to a tip of each guide pin to prevent the weight from coming off the guide pins when the weight is rotated. With the above-described arrangement, in the vibration motor according to the present invention, the eccentric quantity of the weight with respect to the rotary shaft becomes small by the springs when the rotation of the weight is started. The starting torque of the motor can be, therefore, small. With the start of the rotation of the weight, the eccentric quantity of the weight with respect to the rotary shaft becomes large against the tension of the springs by the centrifugal force of the rotation, and the vibration motor can obtain a sufficient quantity of vibration.

7 Claims, 6 Drawing Sheets

VIBRATION MOTOR FOR OBTAINING A STARTING TORQUE WITH A SMALL CURRENT

CROSS-REFERENCE TO RELATED APPLICATION

The present patent application is a continuation of application, Ser. No. 08/384,854, filed Feb. 7, 1995, now abandoned.

BACKGROUND OF THE INVENTION

1. Field of the Invention

The present invention relates to a motor, and more particularly to a motor generating vibrations.

2. Description of the Related Art

A vibration motor of this type has been conventionally used in a selective calling receiver and others. The vibration motor in the selective calling receiver is used for informing a user of a call reception.

A conventional vibration motor is provided with a motor body having a rotary shaft. Further, a weight is attached to the rotary shaft. The weight is so disposed as to be eccentric with respect to the rotary shaft.

In the conventional motor, the rotary shaft is rotated with the electric power supplied from a motor power supply terminal. The rotation of the rotary shaft involves the rotation of the weight, and the vibration motor generates vibrations.

In the conventional vibration motor, however, since the weight is directly fixed to the rotary shaft, a large starting torque for rotating the weight is required. The motor power supply terminal must therefore supply a large amount of current to the motor body, and hence the selective calling receiver using the motor of this type requires a large scale power supply. The dimension of the selective calling receiver thus becomes large, deteriorating the portability.

U.S. Pat. Nos. 4,830,534 and 3,822,604, to Schmelzer et al. and Grimmer, respectively, disclose vibration motors having a weight which is displaced from a rotary shaft of the motor when the shaft rotates to provide an eccentricity and thus a vibration. While these inventions have their benefits, the shape of the weights used leads to inefficiencies in the required starting torques. Also, the shape of the weight is such that it does not contribute efficiently to the eccentricity of the system when the weight is fully displaced from the shaft.

In addition, as a prior art vibration motor, a vibration motor using ultrasonic vibrations produced by a piezoelectric device as a driving source has been also used. This type of motor is disclosed in Japanese Patent Laid-open No. heisei 2-111269 or Japanese Patent Laid-open No. showa 63-262069, for example.

This type of motor has however a complicated structure, thereby increasing the manufacturing cost.

SUMMARY OF THE INVENTION

An object of the present invention is therefore to provide a vibration motor being capable of obtaining a starting torque for a motor with a small current.

It is another object of the present invention to provide a vibration motor having a weight in which substantially all of its portions contribute evenly and efficiently to the eccentricity of the motor when the weight is at the point of greatest eccentricity.

To achieve these aims, a vibration motor according to one aspect of the present invention includes a motor having a rotary shaft. A weight is provided to a motor through guide pins formed to a rotary shaft. One end of each spring is connected to the rotary shaft and the other end of the same is connected to the weight. The guide pins guide the movement of the weight with respect to the rotary shaft in the vertical direction. Holes are formed in the weight and the guide pins are pierced therethrough. A hook is formed to a tip of each guide pin in order to prevent the weight from coming off the guide pin when the weight is rotated.

With the above-described arrangement, in the vibration motor according to the present invention, the eccentric quantity of the weight with respect to the rotary shaft is reduced by means of the springs when the rotation of the motor is started. As a result, the starting torque of the motor can be small. Upon starting the rotation of the weight, the eccentric quantity of the weight with respect to the rotary shaft becomes large against the tension of the springs by the centrifugal force of the rotation, and the vibration motor hence can obtain a sufficient quantity of vibration. The rotation of the shaft is increased until the weight rests against the hooks formed at the tip of the guide pins and reaches a point of greatest eccentricity where substantially all portions are equidistant from the shaft and thus contribute evenly to the eccentricity.

BRIEF DESCRIPTION OF THE DRAWINGS

These and other objects, features and advantages of the invention will become more fully apparent from the following detailed description taken in conjunction with the accompanying drawings.

DETAILED DESCRIPTION OF THE PREFERRED EMBODIMENT

Figure 1:
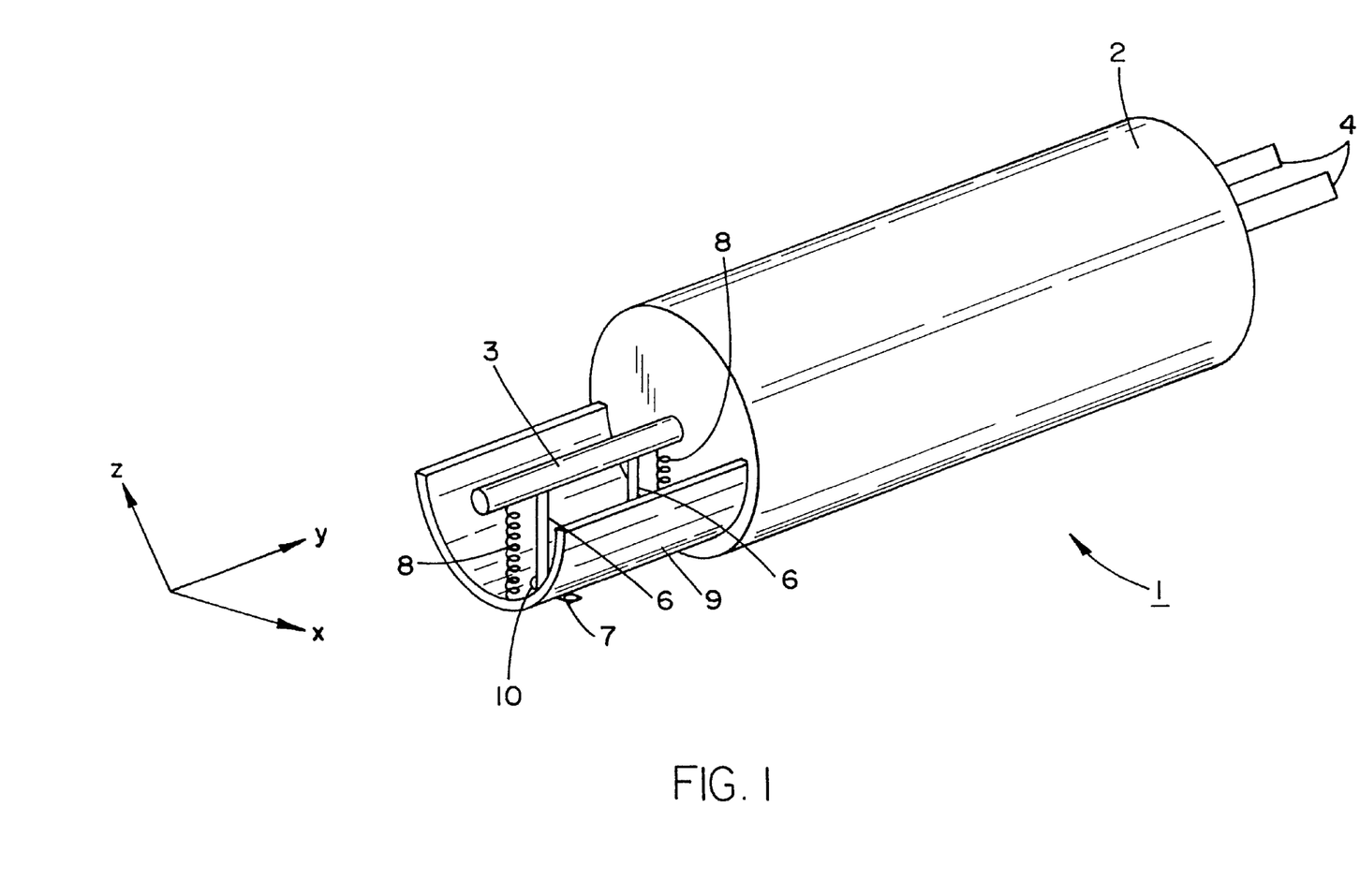
FIG. 1 is a perspective view showing an embodiment according to the present invention.

As shown in FIG. 1, a vibration motor 1 according to the present invention is provided with a motor body 2 having a rotary shaft 3. A motor power supply terminal 4 is connected to a non-illustrated power supply to supply the electric power to the motor body 2. To the rotary shaft 3 are formed at least two guide pins 6 each having a hook 7 at the tip thereof. Each guide pin 6 is formed to the shaft 3 in the substantially-vertical manner along the axial direction of the shaft 3. The guide pin 6 is pierced through each hole 10 provided in a weight 9. The weight 9 is fitted to the shaft 3 by the contact made between the hook 7 and the weight 9 when the shaft 3 is rotated. Each spring 8 has one end connected to the shaft 3 and the other end connected to the weight 9. The weight 9 has a such shape that can be obtained by cutting a hollow cylinder in the vertical direction, and the aforesaid holes 10 are formed thereto.

The operation of the vibration motor will now be described with reference to FIGS. 2A to 5.

Figure 2A:
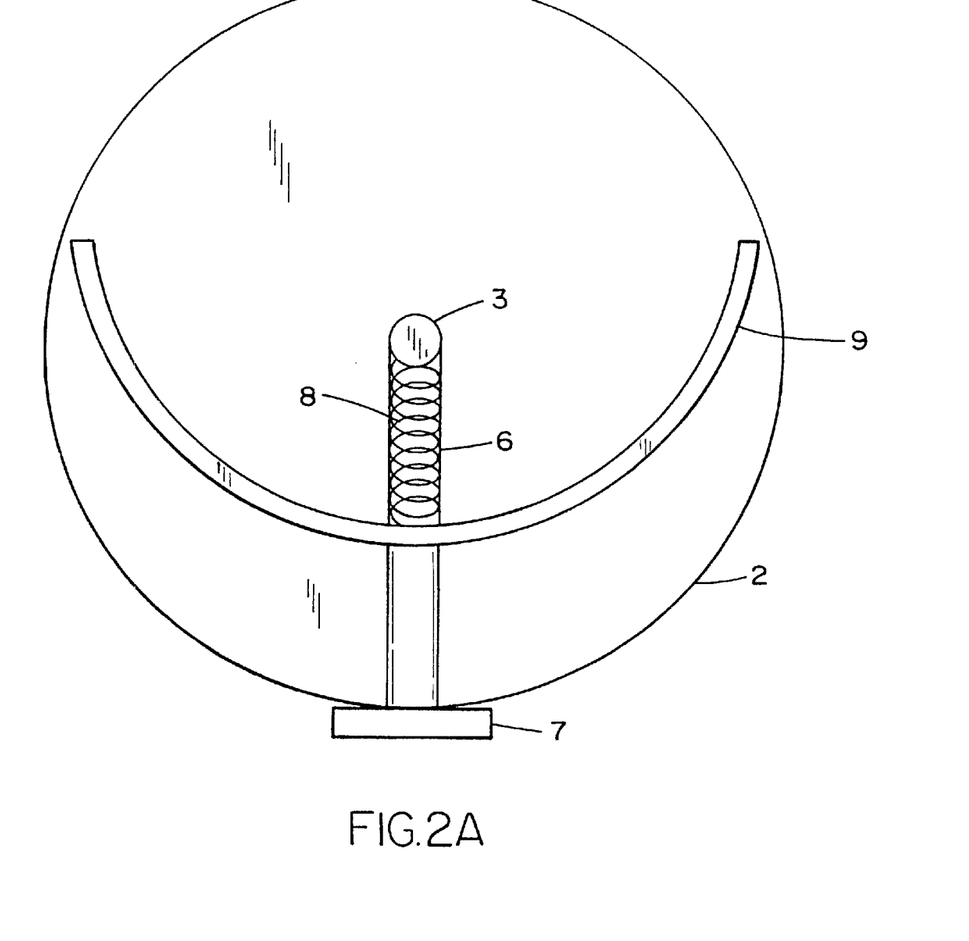
FIG. 2A is a cross sectional plan view taken along the x-z plane shown in FIG. 1 when a motor is not rotated.
Figure 2B:
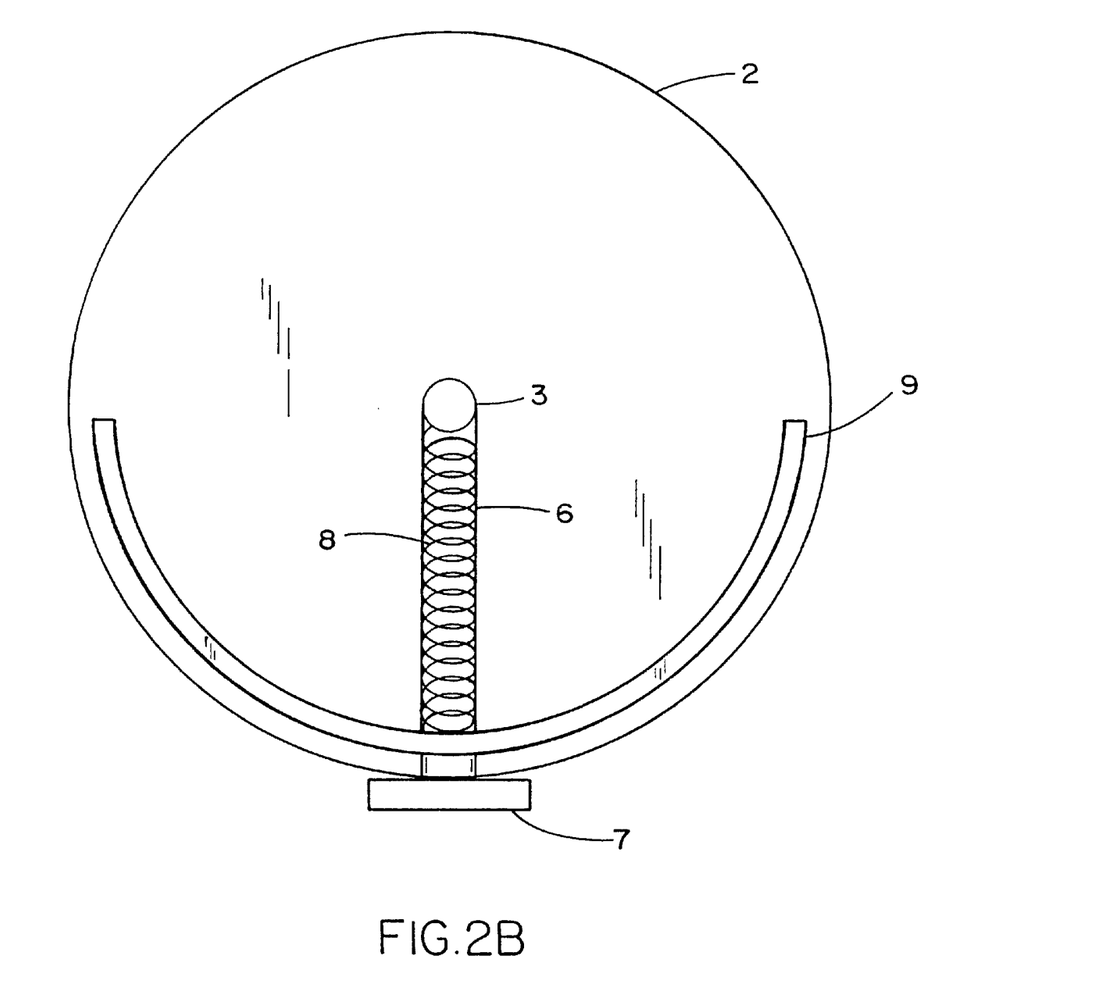
FIG. 2B is a cross sectional plan view taken along the x-z plane shown in FIG. 1, when the motor is rotated and the weight is at a point of greatest eccentricity.
Figure 3:
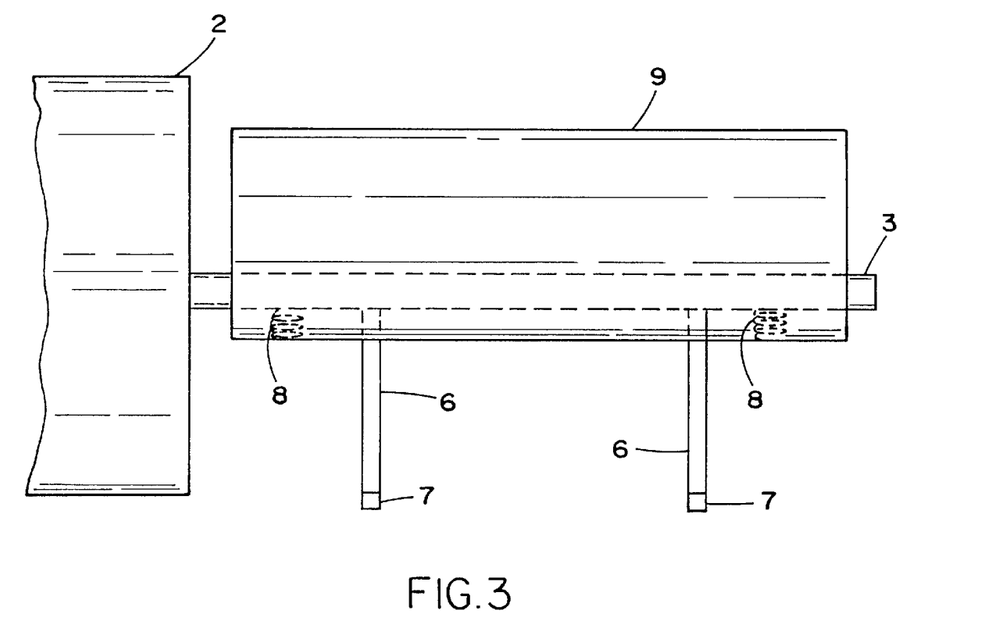
FIG. 3 is a side elevational view taken along the z-y plane shown in FIG. 1 when the motor is not rotated.

Referring to FIGS. 2A and 3, each spring 8 is contracted when the shaft 3 is not rotated, thus, the weight 9 has an impetus with respect to the shaft 3. Therefore, when the rotation of the shaft 3 involves the rotation of the weight 9 in this state, the starting torque can be small and the weight can be rotated with a small amount of current. The rotation of the shaft 3 provokes the expansion of each spring 8. With the expansion of the spring 8, the weight 9 is moved toward the lower portion in the drawings along the guide pins 6. The eccentric quantity with respect to the shaft 3 thus becomes large, thereby producing a sufficient quantity of vibration.

Figure 4:
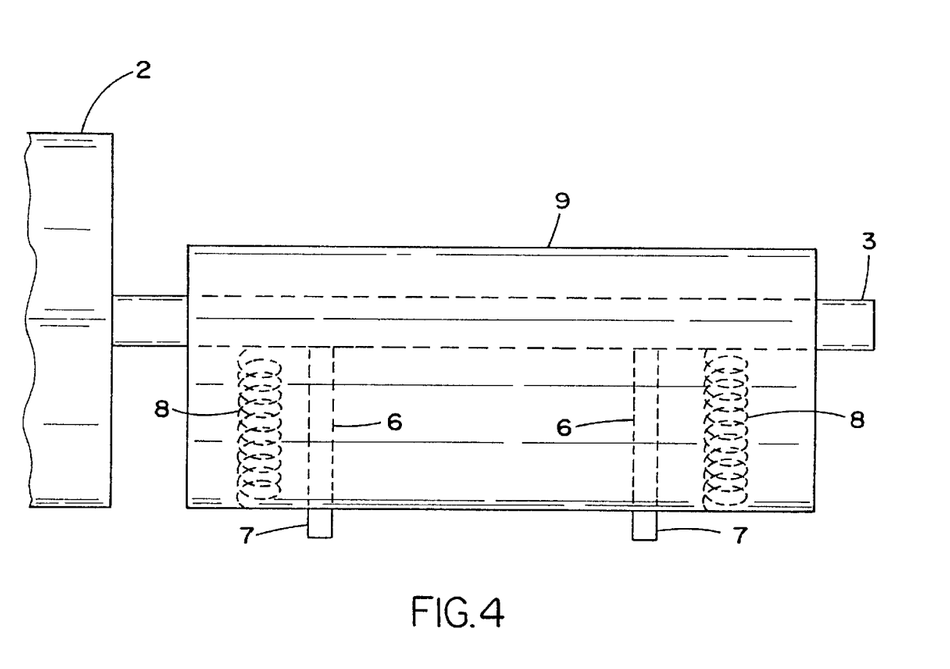
FIG. 4 is a side elevational view taken along the z-y plane shown in FIG. 1 when the motor is rotated.
Figure 5:
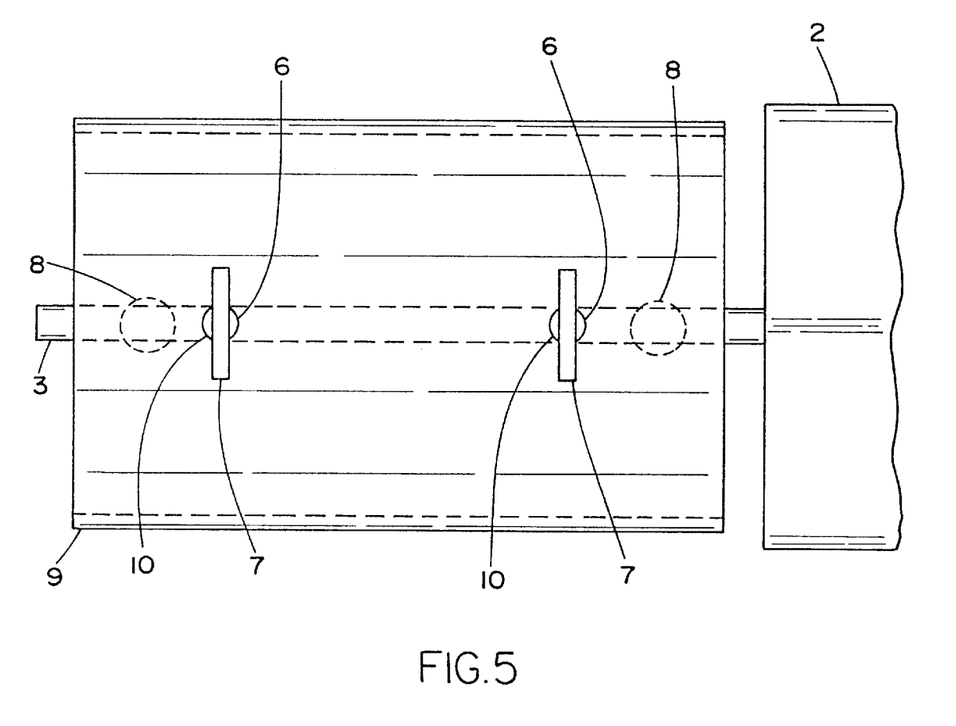
FIG. 5 is a bottom view taken along the x-y plane shown in FIG. 1 when the motor is rotated.

After the elapse of a predetermined time from the start of the rotation of the shaft 3, as shown in FIG. 4, the spring 8 is fully expanded. At this time, even when each spring 8 is completely expanded and the maximum eccentric quantity of the weight 9 with respect to the shaft 3 is obtained as shown in FIGS. 4 and 5, the weight 9 does not protrudes from the shaft 3 to come off since the hooks 7 come into contact with the weight 9. It is at this position, illustrated in FIG. 2B, that the weight attains a position of greatest eccentricity. As is clearly shown in FIG. 2B, all portions of the weight are an equal distance from the shaft and, therefore, contribute evenly and efficiently to the eccentricity of the vibration motor to attain a large quantity of vibration in a limited space. Preferably, this position of greatest eccentricity is maintained for the duration of the vibration.

As described above, since the eccentric quantity of the weight 9 with respect to the shaft 3 is small when the rotation of the shaft 3 is started, the rotation of the weight 9 is started by only supplying a small amount of current to the power supply terminal 4. When the rotation of the weight 9 is once started, the weight 9 is moved along the guide pins 6 against the tension of the springs 8 so as to be away from the shaft 3 by the centrifugal force of the rotation. At this time, although the inertial force acts on the weight 9 in the direction opposed to that of the rotation with the increase in the rotational speed, the inertial force is offset by the contact made between the weight 9 and the guide pins 6. The weight 9 is gradually moved away from the shaft 3 when the rotation is started and moved to the position where the weight 9 is brought into contact with the hooks 7, as shown more clearly shown in FIG. 2B. At this time, the eccentric quantity is, therefore, sufficiently large in comparison with that attained when the rotation of the weight 9 is started, thereby obtaining a sufficiently large quantity of vibration.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A vibration motor comprising:
    a motor having a rotary shaft extending from said motor;
    a weight;
    eccentric means for increasing an eccentric quantity of said weight with respect to said shaft of said motor with a rotation of said weight such that all portions of said weight are maintained substantially equidistant from said shaft when said weight reaches its position of greatest eccentricity, said eccentric means comprising at least two guide pins for guiding a movement of said weight for increasing said eccentric quantity, the guide pins being attached to said rotary shaft and disposed axially along said rotary shaft.

2. The vibration motor of claim 1, wherein said eccentric means comprises a spring having one end connected to said rotary shaft and the other end connected to said weight.

3. The vibration motor of claim 1, wherein said weight includes holes through which each of said guide pins is pierced; and said vibration motor further comprises a hook which is formed at a tip of each guide pin for preventing said weight from coming off said guide pins when said weight is rotated.

4. The vibration motor of claim 1, wherein said weight has a shape such as is obtained by cutting a hollow cylinder in the vertical direction forming an arcuate segment that angularly extends partly around said shaft.

5. The vibration motor of claim 1, wherein the weight is at a position of low eccentricity with respect to said rotary shaft before said rotation of said weight such that the subsequent rotation of said weight requires a small starting torque resulting in minimal power consumption.

6. A method for generating vibration with a vibration motor, the method comprising the steps of:
    maintaining an eccentric quantity of a weight, which is small with respect to a central axis of the motor;
    starting a rotation of said weight;
    enlarging said eccentric quantity with said rotation of said weight such that all portions of said weight contribute substantially the same amount of eccentricity when the weight is maintained at its point of greatest eccentricity; and
    guiding a movement of said weight for increasing said eccentric quantity with guide pins attached to said rotary shaft and disposed axially along said rotary shaft.

7. The method of claim 6, further comprising the step of keeping said eccentric quantity constant with said rotation of said weight.

* * * * *

UNITED STATES PATENT AND TRADEMARK OFFICE
CERTIFICATE OF CORRECTION

PATENT NO. : 5,909,074
DATED : June 1, 1999
INVENTOR(S) : Kei Takaya, et al.

It is certified that error appears in the above-identified patent and that said Letters Patent is hereby corrected as shown below:

On the Title Page, item [30], under "Foreign Application Priority Data", line 1:

"7-036437" should read --6-36437--

Signed and Sealed this

First Day of February, 2000

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT : 5,909,074

DATED : June 1, 1999

INVENTOR(S) : Kei Takaya et al

It is certified that error appears in the above-identified patent and that said Letters Patent is hereby corrected as shown below:

On the title page, item [56], under "U.S. Patent Documents", before "3,911,416..." insert the following:

--3,772,923    11/1973    Burt ..........--.

Signed and Sealed this

Seventh Day of March, 2000

Q. TODD DICKINSON

*Attest:*

*Attesting Officer*        *Commissioner of Patents and Trademarks*